July 7, 1970  J. DORNIER  3,519,916
ALTERNATING CURRENT GENERATOR HAVING CENTRIFUGAL
LEVER ARRANGEMENT FOR ENGAGEMENT
WITH THE BRUSHES
Filed Dec. 15, 1967                              2 Sheets-Sheet 1

INVENTOR
JUSTUS DORNIER

BY *James E. Bryan*
ATTORNEY

United States Patent Office 3,519,916
Patented July 7, 1970

3,519,916
ALTERNATING CURRENT GENERATOR HAVING CENTRIFUGAL LEVER ARRANGEMENT FOR ENGAGEMENT WITH THE BRUSHES
Justus Dornier, Friedrichshafen, Germany, assignor to Dornier A.G. Friedrichshafen (Bodensee), Germany, a corporation of Germany
Filed Dec. 15, 1967, Ser. No. 690,849
Claims priority, application Germany, Sept. 23, 1967, D 54,192
Int. Cl. H02k 9/26
U.S. Cl. 322—56         2 Claims

ABSTRACT OF THE DISCLOSURE

An apparatus for maintaining constant the frequency of an alternating current generator driven at varying speeds. The apparatus includes a rotor and a collector mounted on a rotatable shaft, a rotatable brush cage for supplying exciting current to the collector, a motor for driving the brush cage at a constant speed corresponding to the desired alternating current frequency, and centrifugal lever arrangement for engagement with the brushes.

Figure 1:
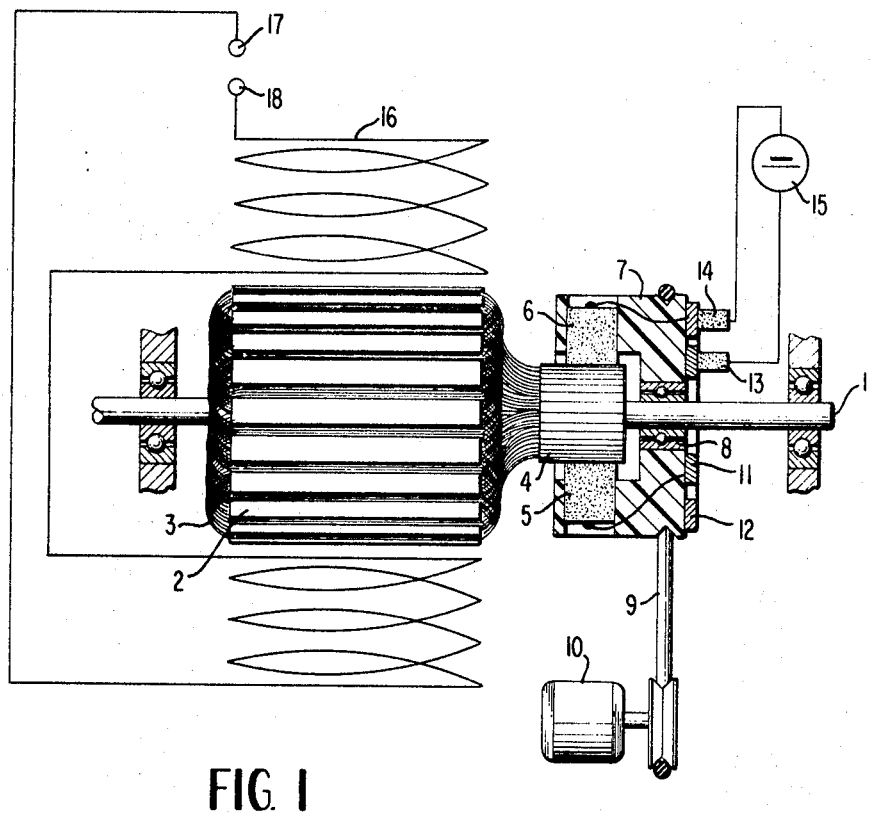

In alternating current generators employed in power stations, it is well known that the frequency of the generated current is proportional to the speed of the armature. The speed of the driving engine must be maintained exactly constant during the operation thereof if a specific frequency of the current produced is required. This requirement can be readily satisfied if stationary plants are involved, the driving engines of which are specifically constructed for this purpose.

The situation is entirely different in the case where the current or power supply of mobile plants is involved, i.e., in vehicles such as aircraft, ships, and the like. For smaller installations, such as vehicles, a direct current plant, the operation of which is known to the art, is generally sufficient and, accordingly, such a plant will not be further described here. As soon, however, as the current requirements or current demand exceed a specific amount, as is the case, for example, in aircraft, a direct current plant is no longer adequate. In this case, alternating current generators are preferred because they satisfy the requirements better. In this connection, it is a drawback that the alternating current generator must be driven with a separate driving engine, since the generator will supply the required frequency of the current only at a constant speed.

Known to the art is a solution for the current or power supply of aircraft in which an alternating current generator is used which is driven by the propelling engine of the aircraft and which is, thus, subjected to all of the variations in speed thereof but which furnishes nevertheless a constant frequency of the current. A transmission system is employed in this case having an automatically variable gear ratio. This solution has been found to be most satisfactory primarily in modern aircraft electrical wiring systems and has been widely used therefor. The mechanical variable speed transmission, however, is of necessity complicated and expensive. Furthermore, it operates only within a limited speed range.

The present invention provides a mechanism designed to maintain constant the frequency of alternating current generators which are suitable for the current supply of the electrical wiring systems in mobile installations, particularly aircraft, and which furnishes a current having a constant frequency despite the greatly varying speed of the propelling engine of the aircraft. In the present invention, a collector is mounted at the generator rotor and the supply of exciting current to the collector is effected by means of a rotatable brush cage, this brush cage being driven at a constant speed which corresponds to the required alternating current frequency. In order to allow for the possibility of varying the frequency if necessary, in a further embodiment of the present invention, the driving engine of the brush cage is constructed in a manner such as to be adjustable with respect to the speed thereof, i.e., the speed of the driving engine may be regulated by a simple means. This driving engine may be mechanically connected with the brush cage by means of V-belts, chains, gears, or the like. It is also possible to construct the brush cage and the motor as a single unit with both elements mounted on a single shaft. By mounting slip rings at the outside of the brush cage, which rings have an electrical connection to the brushes, it is possible to connect a direct current source which supplies the exciting current.

By virtue of this arrangement, it is possible for the alternating current generator to furnish a current having a constant frequency independently of the speed of the armature thereof. Accordingly, mechanical means such as adjustable transmissions and the like, which have the disadvantage that, on the one hand, they operate only within specific speed limits and, on the other hand, require frequent servicing, are eliminated. In addition, such transmissions involve a considerably increased weight, which should be avoided, for example, in aircraft. The most important advantage afforded by the present invention resides, however, in the low cost of the system of the invention, which amounts only to about ⅕ to ⅙ of an alternating current plant provided with a variable speed transmission.

Figure 2:
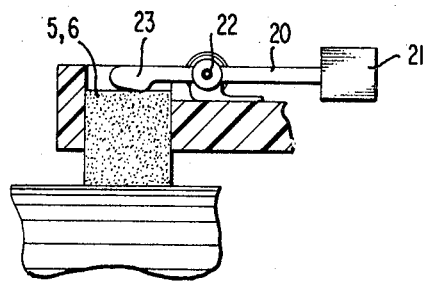
Figure 3:
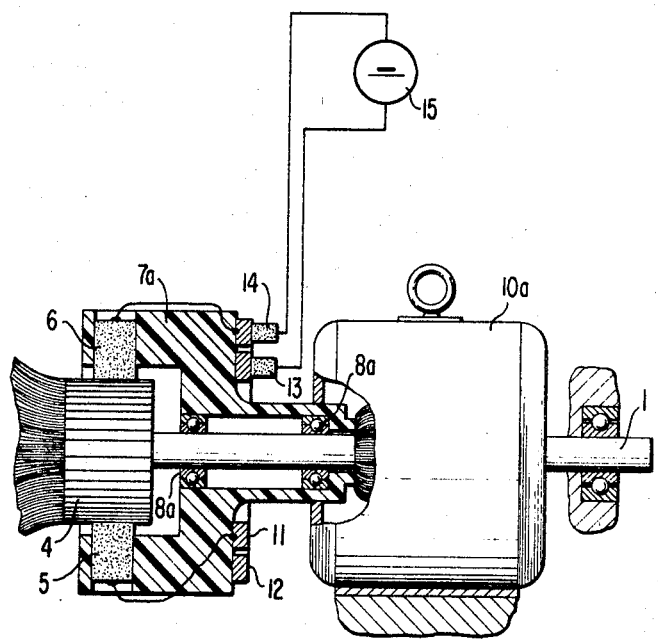

The invention will be further illustrated by reference to the accompanying drawings in which FIG. 1 is a schematic illustration of an alternating current generator and a system for maintaining the frequency constant, FIG. 2 illustrates a modified construction of the brushes, and FIG. 3 illustrates another construction of the drive for the brush cage.

As is apparent from FIG. 1, the alternating current generator consists of the drive shaft 1 and a rotor 2 which is mounted on the drive shaft and is made of slotted soft-magnetic sheet material. The rotor 2 carries the exciting winding 3, in known manner. This winding may be, for example, a wave winding which is closed within itself, as is customary for the rotors of direct current machines. The winding heads are electrically conductively connected to the laminae of a collector 4 which latter is also mounted on the drive shaft 1. Rotatably mounted on the drive shaft 1 is a brush cage 7 having the brushes 5 and 6 mounted therein. It is desirable to make the brush cage 7 from a dielectric material. A groove may be provided within the plane of the bearing support 8 of the brush cage 7 if it is intended to utilize a belt transmission or belt drive. Also possible is the use of a chain drive or a gear drive for the power transmission to the brush cage. The belt 9, which is shown in the drawing by way of example, is connected with a small auxiliary motor 10.

Mounted on the brush cage 7 are the slip rings 11 and 12 which are conductively connected with the brushes 5 and 6 of the cage 7. Mounted in contact with the slip rings 11 and 12 are additional brushes 13 and 14 which are connected to a source of exciting current 15, which may be an accumulator or storage battery, for example. The stationary, either bipolar or multipolar stator, not shown, of the alternating current generator, which is fabricated from laminated magnetically soft sheet material, is provided with a generator winding 16 and, in the case of multiphase generators, with a corresponding number of windings which latter are connected with the output terminals 17 and 18 of the generator. Accordingly, the drive shaft 1 rotates with the rotor 2 at a speed $n_1$ which is determined by the driving system or propulsion unit of the aircraft or other vehicle and varies in dependence upon the respective load condition thereof. The brush cage 7 rotates at a constant speed $n_2$, driven by the auxiliary motor 10.

It should be noted that in case the generator is not driven by the propulsion system of the vehicle, i.e., if the rotor is at a standstill and, thus, $n_1=0$, the rotor 2 produces a magnetic field which rotates in space at the speed $n_2$ of the brush cage 7 and which induces, in turn, a current J in the generator winding 16 whose frequency $f_1$ is equal to the speed $n_2$ of the brush cage 7. As long as the rotor is at a standstill, the apparatus acts as a transformer which transforms the direct current taken from the accumulator or battery 15 into an alternating current having the frequency $f_1=n_2$. This frequency depends, of course, upon the speed $n_2$ of the brush cage 7 which may be easily adjusted to any desired value.

If not only the brush cage 7 rotates at the speed $n_2$ but also if the rotor 2 is driven at the speed $n_1$, the following equation applies for the frequency $f'$ of the magnetic field produced in the rotor, based upon a coordinate system being stationary with respect to the rotor:

$$f'=n_1-n_2$$

For the frequency $f$ of the magnetic field flowing through the generator winding 16, based upon a coordinate system being stationary with respect to space, the following equation thus has validity:

$$f=n_1-f'=n_1-(n_1-n_2)=n_2$$

It is evident from the foregoing that the frequency of the generated current is independent of the driving speed $n_1$ of the rotor, but depends merely upon the speed $n_2$ of the brush cage 7 and may be readily adjusted to any desired value by an appropriate regulation of the speed of the auxiliary motor 10.

While the alternating current generator operates merely as a transformer when the rotor stands still and does not itself then produce any electrical energy, it becomes an electrical generator as soon as the rotor 2 rotates and transforms mechanical energy supplied by means of the drive shaft 1 into electrical energy having a constant frequency. This energy is taken from the terminals 17 and 18. The exciter output to be supplied by the current source 15 is, in this case, only a small fraction of the useful output.

While the frequency of the current being produced is completely independent of the driving speed $n_1$, by virtue of the principle set forth herein, this is not a priori true for the output voltage U. For purposes of regulating the output voltage U, an appropriate regulating device, not shown, influences the exciting current $i_e$. Since regulating devices of this type are known to the art, they will not be further described herein.

The brushes 5 and 6 retained in the brush cage 7 and which rotate therewith may, under certain circumstances, neutralize, as a result of the centrifugal force, the pressure which is customarily produced by means of a spring for purposes of biasing the brushes against the collector 4. For this reason, it is advantageous to mount a suitable device on the brush cage 7 in order to maintain the pressure of the brushes 5 and 6 against the collector 4 constant in dependence upon the speed. For this purpose, centrifugal levers 20 are mounted in the plane of the longitudinal rotor axis, as shown in FIG. 2, the pivot points 22 of each of the levers being positioned to the side of the brushes 5 and 6. Each of the centrifugal levers 20 has at one end thereof a centrifugal weight 21. Positioned opposite thereto is a bearing arm 23 which transmits the force of the centrifugal weight to the brushes 5 and 6 by means of the corresponding lever arm. The construction of this centrifugal lever 20 ensures that the contact or bearing pressure of the brushes remains constant at all speeds.

FIG. 3 illustrates another construction of the drive for the brush cage. In this embodiment, the auxiliary motor 10a is made as an integral unit with the brush cage 7a and is mounted directly on the rotor shaft 1. The housing of the auxiliary motor 10a is supported on the machine frame. The shape of the brush cage 7a is approximately the same as that of the brush cage 7 described hereinabove but, on the one hand, the armature shaft of the auxiliary motor 10a is directly connected wtih the brush cage 7a and, on the other hand, this structural unit is mounted on the rotor shaft 1 by means of a double bearing support 8a. Due to this direct connection between the armature shaft of the auxiliary motor and the brush cage, the speed of the brush cage 7a is equal to the set speed of the auxiliary motor 10a. The various structural elements, such as the brushes 5 and 6, and the slip rings 11 and 12, are mounted at the same position as in the case of the brush cage 7. The advantage of this construction is that additional transmission means, such as belts and the like, for driving the brush cage may be dispensed with, and a compact construction is obtained A particular advantage of the present invention resides in the fact that the system for maintaining constant the frequency of alternating current generators is very simple in the construction thereof and much cheaper to buy than the heretofore known alternating current generators provided with a variable gear ratio. In addition, the generator of the present invention requires very little maintenance. In use in mobile installations, particularly aircraft, there is no need to forego the advantages of an alternating current generator in order to eliminate the disadvantages outlined above. Most important, however, is the fact that the advantages of the alternating current generator are not achieved at the expense of additional weight, such as that resulting from the use of special transmissions.

It will be obvious to those skilled in the art that many modifications may be made within the scope of the present invention without departing from the spirit thereof, and the invention includes all such modifications.

What is claimed is:

1. An apparatus for maintaining constant the frequency of an alternating current generator driven at varying speeds which comprises a rotor and a collector mounted on a rotatable shaft, a rotatable brush cage for supplying exciting current to the collector, means for driving the brush cage at a constant speed corresponding to the desired alternating current frequency, and centrifugal lever means in engagement with brushes in the brush cage, the pivot points of the lever means being positioned in the plane of the longitudinal rotor axis above the brushes.

2. An apparatus according to claim 1 including weight means on the centrifugal lever means, which weight means are adjustable in accordance with a desired operating speed.

References Cited

UNITED STATES PATENTS

| 1,354,698 | 10/1920 | Shallcross | 310—219 |
| 2,221,982 | 11/1940 | Mayer | 310—241 |
| 2,739,278 | 3/1956 | Blankenship | 310—174 |
| 2,949,680 | 8/1960 | Black | 310—214 |

WARREN E. RAY, Primary Examiner

R. SKUDY, Assistant Examiner

U.S. Cl. X.R.

310—219, 242